3,125,604
PRODUCTION OF DIARYL SULFONES
Gordon B. Robbins, Claymont, Del., assignor to E. I. du Pont de Nemours and Company, Wilmington, Del., a corporation of Delaware
No Drawing. Filed Jan. 23, 1961, Ser. No. 83,935
7 Claims. (Cl. 260—607)

This invention relates to the manufacture of diaryl sulfones. More particularly, this invention deals with manufacture of diaryl sulfones of the formula Ar—So₂—Ar′ wherein Ar and Ar′ are like or unlike aryl radicals of relatively simple structure, embracing not more than 12 C-atoms each in its nuclear skeleton and in which the nuclear carbon atoms have their outer valencies satisfied by hydrogen or inert, neutral, non-meta-directing substituents, as for instance by lower alkyl (1 to 4 C-atoms), alkylene (e.g. the —CH₂CH₂CH₂CH₂— group in tetrahydronaphthalene or the —CH₂CH₂CH₂— group in indane), alkoxy (methoxy or ethoxy), thioalkyl (e.g. thiomethyl), halogen (F, Cl or Br), phenyl, nitrophenyl or phenoxy.

It is an object of this invention to provide an improved process for the manufacture of diaryl sulfones whereby to obtain the same in good yield, relatively high purity, and great overall economy. Other objects and achievements of this invention will appear as the description proceeds.

Diaryl sulfones have hitherto been prepared by various methods, one of which involved heating together an aryl sulfonyl chloride of the formula Ar—So₂Cl with an unsulfonated aryl compound of the formula H—Ar′, Ar and Ar′ being aryl radicals as above defined, in the presence of a Friedel-Crafts catalyst, such as AlCl₃ or FeCl₃. This mode of synthesis requires first the preparation and isolation of an aryl sulfonyl chloride, usually from the corresponding sulfonic acid. Furthermore, the condensation of the compound of formula Ar—SO₂Cl with a compound of formula H—Ar may in special cases not be feasible, for instance, where the Ar radicals contain a chloro-alkyl side chain, say the group —CH₂CH₂Cl, in which case treatment with Friedel-Crafts catalysts may result in side reactions, reducing or completely destroying the yield of the desired product.

It has also been known that in the sulfonation of aryl compounds of the formula H—Ar, a certain quantity of sulfone of the formula Ar—SO₂—Ar may be produced as a by-product. Such quantities, however, are of the order of a few percent and cannot form the basis for production of diaryl sulfones on a commercial scale.

It has also been suggested to prepare diaryl sulfones by reacting an aryl sulfonic acid of the formula Ar—SO₃H with an unsulfonated aryl compound of the formula H—Ar in the presence of phosphorus pentoxide, which serves as a dehydrating agent. Phosphorus pentoxide, however, is a noxious compound, and is objectionable from many angles for use in large scale production. Firstly, the compound is solid and has to be powdered. In this form, it is readily converted to a sticky mass by exposure to atmospheric moisture, and this makes its use troublesome and time consuming. Also, the dust does not ordinarily dissolve in the reaction mass, and its action is therefore apt to be non-uniform and inefficient.

I have now found that mixtures of aryl sulfonic acids and unsulfonated aryl compounds, of the formulas Ar—SO₃H and H—Ar as above defined, readily lend themselves to conversion into diaryl sulfones by the presence of a pentavalent phosphorus halide, for instance, phosphorus pentachloride, pentabromide, oxychloride or oxybromide, which acts as a condensing agent. This effect is entirely surprising, considering that the closely related phosphorus trichloride is very inefficient for the aforegoing purpose. In addition, the phosphorus oxyhalides are liquid at ordinary temperatures and dissolve readily in most reaction mixtures of the above type, while the phosphorus pentahalides can be produced in situ in liquid form by passing, say, chlorine gas or bromine into a solution of phosphorus trichloride or tribromide in an organic solvent.

To a certain extent, by-formation of an aryl sulfonyl halide occurs in my improved process above, in many cases, in view of the customary capacity of the phosphorus pentahalides and oxyhalides to act both as halogenating agents and as dehydrating agents. But this side effect is not detrimental for two reasons:

Firstly, the yield of diaryl sulfone in my improved process is high enough to justify in many cases isolation of the same by drowning the reaction mass in hot water, whereby the by-product aryl sulfonyl halide is hydrolyzed into a water-soluble aryl sulfonic acid and is carried off in the filtrates. (The principal product, the sulfone, is generally insoluble in cold water, and can be readily filtered off upon cooling the drowned mass.) This process is of particular value in cases such as chloro-ethylbenzene sulfonic acid, which would lead to undesirable condensations through the side chain, if treated with Friedel-Crafts catalysts.

In the second place, the reaction mass containing the desired sulfone and the by-product Ar—SO₂— halide may in most cases be treated directly with a Friedel-Crafts catalyst to convert said halide into further quantities of sulfone (by reaction with residual quantities of the H—Ar compound present in the mass), whereby to raise still higher the yield of the desired compound. Recovery may then be achieved by drowning in hot water, cooling, filtering and washing, as above.

My improved process has the further advantage of being adapted for application directly to the reaction mass in which the aryl sulfonic acid is produced. For instance, an aryl compound of formula H—Ar, as defined above, may be treated with about one half its molal quantity of a convenient sulfonating agent, e.g. chlorosulfonic acid or sulfur trioxide, so as to sulfonate one-half, more or less, of the aryl compound. The resulting mixture may then be treated directly with a halide of pentavalent phosphorus as above indicated. If the quantity of initial aryl compound is more than in 2:1 molar ratio to the sulfonating agent, the excess does no harm in the subsequent treatment with the phosphorus halide, but serves indeed as a diluent for the reaction mass. If the quantity is less than 2 moles, say if it is as low as 1.8 moles per mole of ClSO₃H, the deficiency again does no harm, inasmuch as the excess aryl-sulfonyl chloride compound will be removed in the filtrates in the isolation step. Moreover, if desired, an additional quantity of the unsulfonated H—Ar compound may be added to the reaction mass in the topping off step, i.e. in the step of treating the reaction mass with a Friedel-Crafts catalyst.

If the mixture of Ar—SO₃H and H—Ar is produced, as above indicated, by sulfonating about half of a given quantity of the H—Ar compound, the Ar radicals of the two reactants will, naturally, be alike. Such a process is most convenient when the H—Ar compound is liquid at the sulfonation temperature (usually, 10° to 80° C.).

On the other hand, one may select the Ar—SO₃H compound from stock and mix the same with an optional aryl compound H—Ar′ (within the limits hereinabove set forth), wherein the Ar′ radical may be like or unlike the radical Ar of the sulfonic acid compound. If the H—Ar′ compound is liquid, or if it melts at the temperature of treatment with the phosphorus halide compound (usually 110° to 140° C.), it may be employed in excess, to serve as a solvent or diluent for the reaction mass. But if desired, an extraneous solvent or diluent may be employed. In the latter event, aromatic liquids may be employed provided they are of a nature that is essentially non-reactive or less reactive than the selected H—Ar compound, under the conditions of the reaction, to produce a sulfone. For instance, one may use nitrobenzene or o-dichlorobenzene as diluent.

The degree of reactivity of an aromatic compound with an aryl sulfonic acid of form Ar—$SO_3H$ (as above defined) will depend on the size of the molecule and the nature of the substituents that it carries on the nuclear C-atoms. The size of the molecule has been limited by the above definition to compounds having not more than 12 C-atoms in its cyclic structure. Thus, the definition embraces benzene, naphthalene, indane and dibenzofuran compounds, but none of higher complexity. As for the substituents, certain groups like methoxy or methyl intensify the reactivity of the compound toward an arylsulfonic acid (in the presence of a dehydrating agent). Nuclear halogen, generally decreases the reactivity, while nitro groups retard the reaction to such an extent that it cannot be considered practical. In general, all meta-directing substituents have this retarding effect, and this includes $SO_3H$, COOH and amino substituents (because although amino substituents by themselves are not meta-directing, they form salts with the acids liberated in the reaction mass, and these salts are meta directing). Hydroxyl groups intensify the reactivity very much, but are excluded from the definitions of Ar and Ar' in my invention because of their tendency to produce phosphate esters, which would lead to undesirable by-products. Furthermore, because of their high reactivity, Ar—$SO_3H$ and H—Ar' compounds which possess OH groups as the sole substituents, do not need the special procedures of this invention. Altogether, I prefer in my reaction to employ as Ar—$SO_3H$ and H—Ar reactants aromatic compounds wherein the Ar radicals carry no substituents at all (i.e. their carbons are satisfied solely by hydrogen) or they carry inert, neutral, non-meta-directing substituents as exemplified hereinabove.

As further practical illustrations of the reactants which may be employed in the improved process of my invention, the following specific compounds are suggested.

I. ARYL SULFONIC ACIDS

Benzene sulfonic acid,
o, m and p-toluene sulfonic acids,
o, m and p-chlorobenzene sulfonic acids,
o, m and p-xylene sulfonic acids,
o, m and p-bromobenzene sulfonic acids,
o, m and p-fluorobenzene sulfonic acids,
4-tert.-butyl benzene sulfonic acid,
3,4-dichlorobenzene sulfonic acid,
4,5-dichloro-2-methyl benzene sulfonic acid,
4,5-dichloro-2-methoxybenzene sulfonic acid,
4-chloro-3-methyl benzene sulfonic acid,
o, m and p-methoxybenzene sulfonic acids,
2-methoxy-5-methyl benzene sulfonic acid,
4-methoxy-2-methyl benzene sulfonic acid,
3-chloro-4-methoxybenzene sufonic acid,
4-chloro-2,5-dimethyl benzene sulfonic acid,
2,5-dimethoxybenzene sulfonic acid,
4-chloro-3-methoxybenzene sulfonic acid,
2,5-dimethoxy-4-methyl benzene sulfonic acid,
2,4-dimethoxybenzene sulfonic acid,
o and p-phenyl benzene sulfonic acid,
4-nitrophenyl benzene sulfonic acid,
1- and 2-naphthalene sulfonic acids,
4-phenoxybenzene sulfonic acid,
4-methylmercaptobenzene sulfonic acid and
2-methylmercapto-5-methyl benzene sulfonic acid.

II. NON-SULFONATED ARYL COMPOUNDS

Benzene,
Toluene,
o, m and p-xylenes,
Naphthalene,
1,2,3,4-tetrahydronaphthalene,
Biphenyl,
4-nitrobiphenyl,
Tert.-butyl benzene,
Ethyl benzene,
n-Propyl benzene,
Isopropyl benzene,
Chlorobenzene,
Bromobenzene,
Fluorobenzene,
o, m and p-dichlorobenzenes,
Anisole,
o, m and p-chloroanisoles,
o, m and p-dimethoxybenzenes,
o, m and p-methylanisoles,
2-chloro-5-methylanisole,
Dibenzofuran,
Diphenyl ether,
3,4-dichlorotoluene,
3,4-dichloroanisole,
o, m and p-chlorotoluenes,
2-chloro-1,4-dimethyl benzene,
2,5-dimethoxytoluene,
Indane,
Methyl phenyl sulfide and
Methyl p-tolyl sulfide.

The quantity of phosphorus halide to be employed in my invention may be close to theoretical, which is 0.2 mole in the case of phosphorus pentachloride or pentabromide and 0.33 mole in the case of the corresponding oxyhalides. Wide latitude, however, is permissible in this respect, and the actual quantity used may vary from 0.2 to 1 mole per mole of the sulfonic acid, with a preferred range 0.35 to 0.5 mole when phosphorus oxychloride or oxybromide is employed. The quantity of Ar—$SO_3H$ compound in the reaction mixture, will generally be stoichiometrically equal to the quantity of Cl—$SO_3H$ (or $SO_3$) employed in the sulfonation step.

In the topping-off step, very small quantities of the Friedel-Crafts catalyst will suffice, firstly because of their inherent power to catalyze greater than equimolar quantities and secondly because the quantity of Ar—$SO_2Cl$ (or Ar—$SO_2Br$) formed as a by-product in my reaction is, generally, but a minor fraction of the initial quantity of Ar—$SO_3H$ in the reaction mixture. Accordingly, from 0.01 mole upwards, but even as high as 1 mole, of the catalyst may be employed, per initial mole of Ar—$SO_3H$. As to the nature of the Friedel-Crafts catalyst, $AlCl_3$ and $FeCl_3$ have already been mentioned. Other known equivalents may be used, for instance $TiCl_4$, $SnCl_4$, $ZnCl_2$ or $BF_3$.

The temperature of the reaction mass in the dehydration step (i.e. treatment with the phosphorus halide compound) will generally vary from 110° to 140° C. The temperature of the topping-off step (e.g. $AlCl_3$) is generally higher, say 140° to 230° C.

Without limiting this invention, the following examples are given to illustrate my preferred mode of operation. Parts mentioned are by weight. The yields mentioned at the end of the examples were calculated on the basis of the initial quantity of Cl—$SO_3H$ (or $SO_3$, where employed) except where otherwise indicated.

*Example 1*

195 parts of benzene were sulfonated with 116 parts chlorosulfonic acid at a temperature below 20° C. in a flask equipped with reflux condenser. The mixture was agitated for ½ hour at 20° to 30° C. and for ½ hour at 70° to 80° C. 77 parts of phosphorus oxychloride were added and the charge was refluxed for eighteen hours. The charge temperature rose from about 80° C. to about 120° C. during this period. The mixture was poured into 800 parts of warm water and agitated at 95° to 100° C. for 2 hours. The suspension of diphenyl sulfone was cooled, filtered and washed with water. The yield was about 65% of material, which melted at 123°–124° C. (The yield was calculated on the chlorosulfonic acid.)

If this example is stopped at the end of the sulfonation step without the phosphorus oxychloride treatment or heating cycle, the yield of diphenyl sulfone is about 12%. This represents the amount formed during sulfonation.

*Example 2*

Example 1 was repeated through the period of reaction with phosphorus oxychloride. At this point the charge was cooled to 95° C. and 2 parts anhydrous ferric chloride were added. The reaction mixture was heated to reflux temperature of about 120° C. for three hours. The product was isolated by treatment with hot water as in Example 1. The yield was about 80% of diphenyl sulfone, melting at 123° to 125° C.

Similar results were obtained when the chlorosulfonic acid in the above example was replaced by 98 parts of stabilized sulfur trioxide.

*Example 3*

155 parts of benzene were sulfonated with 116 parts chlorosulfonic acid as described in Example 1. 77 parts of phosphorus oxychloride were added to the mixture, and it was heated to reflux for 15 hours. The charge temperature rose from about 90° C. to about 140° C. during this period. The reaction mixture was cooled to about 100° C. 3.5 parts of anhydrous ferric chloride were added, and the charge was reheated to a temperature of 145° to 155° C. Benzene was slowly added until a gentle reflux was maintained for about 1 hour at 145° to 155° C. (About 20 parts of benzene were added at this point.) The charge was isolated as described in Example 1. The yield of diphenyl sulfone was about 96%.

*Example 4*

100 parts of benzene were sulfonated with 116 parts of chlorosulfonic acid as described in Example 1. 77 parts of phosphorus oxychloride were added and the reaction was heated to 110° C. 40 parts of benzene were fed into the charge at such a rate that only a gentle reflux was maintained while the charge temperature was held at 110° to 120° C. After the benzene was added and reflux permitted, the charge was heated to 140° C. The total heating period after adding phosphorus oxychloride was 10 hours. The charge was cooled to 100° C. and 5 parts of anhydrous aluminum chloride were added. The charge was heated to 150° to 170° C. and about 20 parts of benzene were added to give a gentle reflux for one hour. The charge was heated to 180° to 190° C. for one hour. It was isolated as described in Example 1. The yield of diphenyl sulfone was about 90%.

If an equal weight of titanium tetrachloride is used in place of the aluminum chloride in this example, a yield of about 85% diphenyl sulfone is obtained.

*Example 5*

86 parts of anhydrous toluene sulfonic acid and 90 parts of benzene were mixed with 77 parts of phosphorus oxychloride. The mixture was heated at reflux overnight. The temperature in the mixture rose from about 90° C. to about 115° C. during this period. 2 parts of ferric chloride were added, and the mixture was refluxed for 4 hours. The phenyl p-tolyl sulfone was isolated as in Example 1. This product melted at 125°–126° C. after crystallization from alcohol. The yield was about 80% (based on the quantity of initial sulfonic acid).

By repeating the details of Example 5, the following sulfones can likewise be prepared:
4-chloro-4'-methyldiphenyl sulfone, from p-toluene sulfonic acid and chlorobenzene;
4-chlorodiphenyl sulfone, from benzene sulfonic acid and chlorobenzene;
3-chloro-4-methoxy-4'-methyldiphenyl sulfone, from p-toluene sulfonic acid and o-chloroanisole;
4'-chloro-2,5-dimethoxydiphenyl sulfone, from 4-chlorobenzene sulfonic acid and 1,4-dimethoxybenzene;
5,4'-dimethyl-2-methoxydiphenyl sulfone, from p-toluene sulfonic acid and p-methylanisole;
5-chloro-4-methoxy-2-methyldiphenyl sulfone; from benzene sulfonic acid and 2-chloro-5-methylanisole.
Phenyl sulfonyl dibenzofuran of melting point 167° to 169° C., by reaction of dibenzofuran and anhydrous benzene sulfonic acid;
4-tolyl 2-(5,6,7,8-tetrahydronaphthyl) sulfone, from p-toluenesulfonic acid and tetrahydronaphthalene;
4-tolyl 2-naphthyl sulfone, from p-toluene sulfonic acid and naphthalene, and
4-phenoxy diphenyl sulfone, from benzene sulfonic acid and diphenyl ether

*Example 6*

117 parts of m-xylene were sulfonated with 58 parts of chlorosulfonic acid as described in Example 1. The mass was then heated at reflux for 12 hours with 77 parts of phosphorus oxychloride, the temperature in the reaction mixture being about 150° C. 2 parts of anhydrous ferric chloride were added, and the charge was heated for 4 hours at 145° to 155° C. The product was isolated by treatment with hot water as described in Example 1. The yield of 2,2',4,4'-tetramethyldiphenyl sulfone was about 97% of material melting at 117° to 121° C. After crystallization from alcohol, the product melted at 122° to 123° C.

When p-xylene was substituted in this example, 2,2',5,5'-tetramethyldiphenyl sulfone was obtained in about 95% yield. It melted at 145°–146° C., after crystallization from toluene.

When mixed xylenes were substituted in the above example, a liquid mixed dixylyl sulfone was obtained in about 90% yield. The product had a refractive index of 1.59 at 25° C. and a sulfur content of 11.5%.

When o-xylene was used in this example, a tetramethyl sulfone was obtained in almost quantitative yield. It had a melting range of 160° to 164° C., after crystallization from alcohol and then from toluene.

When tertiary butylbenzene was employed, a 4,4'-di-tertiarybutyldiphenyl sulfone was obtained which melted at 212° C.

*Example 7*

248 parts of monochlorobenzene were sulfonated with 117 parts of chlorosulfonic acid at 35° to 40° C. The mixture was stirred for 1 hour at 70° C. 77 parts of phosphorus oxychloride were added, and the mixture was heated at reflux for 18 hours. The temperature in the reaction mixture was about 140° C. The charge was cooled to 110° C., and 54.5 parts anhydrous ferric chloride were added. The reaction was continued for 4 hours with heating up to 175° C. The content of the charge was cooled to 70° C. and 800 parts of water were added. Monochlorobenzene was distilled off. The charge was heated at reflux for 1 hour. It was cooled, filtered and washed. The yield was about 90% of 4,4'-dichlorodiphenyl sulfone melting at 145° C.

When bromobenzene was substituted, a similar yield of 4,4'-dibromodiphenyl sulfone was obtained. Fluorobenzene or orthodichlorobenzene treated in similar fashion lead to 4,4'-difluorodiphenyl sulfone and 3,3',4,4'-tetrachlorodiphenyl sulfone, respectively.

By repeating the details of Example 7, the following additional sulfones can be prepared:
2,2'-dimethyl-4,4',5,5'-tetrachlorodiphenyl sulfone, from 4,5-dichloro-2-methylbenzene sulfonic acid and 3,4-dichlorotoluene, and 2,2'-dimethoxy-4,4',5,5'-tetrachlorodiphenyl sulfone, from 4,5-dichloro-2-methoxybenzene sulfonic acid and 3,4-dichloroanisole.

*Example 8*

If the same molar quantity of orthochlorotoluene is substituted for m-xylene in Example 6, the product is a dichlorodimethyldiphenyl sulfone melting at 117°–118° C. after crystallization. This material, which is obtained in about 95% yield, is presumably the 4,4'-dichloro-3,3'-dimethyldiphenyl sulfone.

*Example 9*

If an equimolar amount of anisole is used instead of m-xylene in Example 6, 4,4'-dimethyldiphenyl sulfone is obtained in a yield over 90%.

In the same manner, the following additional sulfones can be prepared:

2,2'-dimethoxy-5,5'-dimethyldiphenyl sulfone, from 2-methoxy-5-methylbenzene sulfonic acid and p-methylanisole;

4,4'-dimethoxy-2,2'-dimethyldiphenyl sulfone, from 4-methoxy-2-methylbenzene sulfonic acid and m-methylanisole;

3,3'-dichloro-4,4'-dimethoxydiphenyl sulfone, from 3-chloro-4-methoxybenzene sulfonic acid and o-chloroanisole; and 2,2' - dimethylmercapto - 5,5' - dimethyldiphenyl sulfone, from methyl p-tolyl sulfide and 2-methylmercapto-5-methylbenzene sulfonic acid.

*Example 10*

147.5 parts of 2-chloro-1,4-dimethylbenzene were treated with chlorosulfonic acid and with phosphorus oxychloride as described in Example 6. 10 parts of anhydrous ferric chloride were added, and the mixture was heated for 160° C. for 3 hours. The product was isolated by hot water treatment as described in Example 1. The yield was about 85% of product which melted at 145°–146° C. after crystallization from alcohol. It analyzed correctly for 4,4'-dichloro-2,2',5,5'-tetramethyldiphenyl sulfone.

*Example 11*

138 parts of 1,4-dimethoxybenzene were melted and 58 parts of chlorosulfonic acid were added at 55°–60° C. The mixture was heated to 70° C. for half an hour and 39 parts of phosphorus oxychloride were added. 65 parts of o-dichlorobenzene were added as a solvent for the reaction. The mixture was heated for 2 hours at 150° to 160° C. It was treated with hot water for sufficient time to volatilize the o-dichlorobenzene. The product, 2,2',5,5' - tetramethoxydiphenyl sulfone, was filtered and washed. The yield was about 75% of material, which melted at 168°–169° C. after crystallization from alcohol.

When an equimolar amount of 4-chloroanisole was treated in the same manner as described above for 1,4-dimethoxybenzene, a similar yield of 5,5'-dichloro-2,2'-dimethoxydiphenyl sulfone was obtained.

By repeating the details of Example 11, the following additional sulfones can be prepared:

4,4'-dimethyl-2,2',5,5'-tetramethoxydiphenyl sulfone, from 2,5-dimethoxy-4-methylbenzene sulfonic acid and 2,5-dimethoxytoluene, and 2,2',4,4'-tetramethoxydiphenyl sulfone, from 2,4-dimethoxybenzene sulfonic acid and 1,3-dimethoxybenzene.

*Example 12*

154 parts of biphenyl were dissolved in 200 parts of nitrobenzene and sulfonated with 58 parts of chlorosulfonic acid at 40° to 50 ° C. 39 parts of phosphorus oxychloride were added, and the mixture was heated at 140° C. for 12 hours. The mixture was cooled to 100° C. and 3 parts of ferric chloride were added. The mixture was heated at 140° C. for 3 hours. The nitrobenzene was steam-distilled off, and the product was filtered. The yield was about 85% of material, which melted at 215° to 217° C. after crystallization from xylene.

If the above procedure is repeated with an equimolar amount of 4-nitrobiphenyl, a 90% yield of material is obtained, which melts at 282°–283° C. and analyzes properly for the 4,4'-(p-nitrophenyl) diphenyl sulfone.

*Example 13*

130 parts of naphthalene were melted at 80° C., and 58 parts of chlorosulfonic acid were added. The mixture was heated to 110° C. for ½ hour. 39 parts of phosphorus oxychloride were added at 100° to 110° C. and the mixture was heated at 130° to 140° C. for 15 hours. 2 parts of ferric chloride (anhydrous) were added at 140° to 150° C. and this temperature was held for 4 hours. The reaction mass was then drowned and steam distilled to remove excess naphthalene. The yield of dry product was 75% of theory. The material, which is a mixture of isomers, was a solid mass without definite melting point. Its sulfur analysis was 9.5% compared with 10.05% theoretical.

*Example 14*

112 parts of 2-chloroethylbenzene (0.8 mole) were sulfonated with 58 parts of chlorosulfonic acid (0.5 mole) at under 30° C. The reaction mass was stirred at 25° to 30° C. for ½ hour and heated to 70° C. for ½ hour. 50 parts of phosphorus oxychloride were added. The mixture was heated to 140° C. for 16 hours. It was then drowned in 1000 parts of water and stirred at 90° to 100° C. for 1 hour. The insoluble product was isolated and crystallized from alcohol. 67 parts of material, melting at 131° to 133° C. and analyzing correctly for 4,4'-(β-chloroethyl) diphenyl sulfone, were obtained. This constitutes a yield of 65% based on the quantity of 2-chloroethylbenzene that remained unsulfonated in the initial step.

*Example 15*

155 parts of benzene were sulfonated with 116 parts of chlorosulfonic acid, as described in Example 1. 62.5 parts of phosphorus pentachloride were added at 40° to 50° C. The charge was heated at reflux (when this was below 140° C.) and then at 140° C. for a period of 15 hours. 3.5 parts of anhydrous ferric chloride were added and the charge was reheated to 145° to 155° C. Benzene was added to maintain a gentle reflux for about 1 hour at 145° to 155° C. The charge was isolated as described in Example 1. The yield was about 75% of diphenyl sulfone.

When 43.5 parts of phosphorus trichloride were substituted for the phosphorus pentachloride in the above reaction on benzene, the product was contaminated diphenyl sulfone, which was obtained in about 40% yield.

*Example 16*

117 parts of p-xylene were sulfonated with 58 parts of chlorosulfonic acid as described in Example 1. 45 parts of phosphorus pentachloride were then added, and the mixture was heated to 130° to 140° C. for 12 hours. 3 parts of anhydrous ferric chloride were added, and the mixture was heated at 145° to 155° C. for 4 hours. The product was isolated by treatment with hot water at described in Example 1. The yield of 2,2',5,5'-tetramethyldiphenyl sulfone was about 98%.

*Example 17*

125 parts p-methylanisole were sulfonated by adding 58 parts chlorosulfonic acid at 10° to 15° C. The mixture was warmed to 70° C. for half an hour and 39 parts of phosphorus oxychloride were added. 30 parts of o-dichlorobenzene were added as solvent. The mixture was heated for 12 hours at such a rate that the charge was under reflux until a temperature of 130° C.

was reached. After this point, a temperature of 130° to 135° C. was maintained.

The product was isolated by stirring with water at 90° to 100° C. for an hour. The yield was 72%, and after recrystallization from alcohol, the dimethoxy-dimethyl-diphenyl sulfone thus obtained melted at 225° to 226° C.

When the above example was repeated using 25 parts phosphorus pentachloride instead of phosphorus oxychloride, a yield of 70% of the same product was obtained.

It will be understood that the details of the above examples may be varied widely within the skill of those engaged in this art.

It will be noted, in summary, that my invention not only provides an economical and efficient process for producing diaryl sulfones by starting directly with aryl sulfonic acids (which are generally much less costly than the corresponding sulfonyl halides), but it has the further remarkable advantage that whatever by-products are formed, being aryl sulfonyl halides, are in themselves useful for further sulfone formation and can be readily converted into the latter in situ, before the reaction mass is treated to isolate any products therefrom.

The diaryl sulfones discussed above, and producible according to this invention, have varied and known utilities in the art. Thus, practically any of them can be used as a carrier in the dyeing of hydrophobic fiber (such as polyethylene terephthalate fiber). (See German Patent No. 1,080,063 or U.S.P. 2,957,745.) Some of them are useful intermediates in the preparation of other compounds; thus, 4,4'-dichlorodiphenyl sulfone is an intermediate in the preparation of 4,4'-diaminodiphenyl sulfone, which is highly useful as a curing agent for epoxy resins, and may also be used as initial diamine in the production of disazo or polyazo dyes. Other halogenated diphenyl sulfones are acaricidal compounds.

I claim is my invention:

1. A process of producing a diaryl sulfone, which comprises adding from 0.2 to 1.0 mole of a halide of pentavalent phosphorous to a liquid mass containing substantially one mole of an aryl sulfonic acid and at least one mole of an unsulfonated H-aryl compound, each of said aryl compounds containing not more than 12 C-atoms in its nuclear structure and, when further substituted, said substituents are selected from members of the group consisting of alkyl, alkoxy, thioalkyl, halogen, phenyl, nitrophenyl and phenoxy, all alkyls mentioned being radicals of 1 to 4 C-atoms, heating the liquid mass to reflux until evolution of HCl is no longer observed, followed by the addition of a Friedel-Crafts catalyst and further heating the reaction mass whereby to cause reaction between any by-product aryl-sulfonyl halide, and non-sulfonated aryl compound present in the reaction mass, producing additional quantities of the desired diaryl sulfone, then drowning the reaction mass in hot water, cooling to precipitate diaryl sulfone and recovering said precipitate.

2. A process as in claim 1, wherein the quantity of unsulfonated aryl compound in the initial mass is less in moles than the quantity of aryl sulfonic acid present, and wherein the principal reaction set forth in claim 1, prior to drowning in hot water, is followed by the addition of a Friedel-Crafts catalyst and of a quantity of said non-sulfonated aryl compound sufficient to at least make up for its deficiency in moles in the inital reaction mass with respect to said aryl sulfonic acid, and heating the reaction mass whereby to form additional quantities of diaryl sulfone by reaction between said unsulfonated aryl compound and any aryl-sulfonyl chloride formed as a by-product in the first step of the reaction.

3. A process as in claim 1, wherein the reaction mixture containing said aryl sulfonic acid and non-sulfonated aryl compound is formed in situ by adding 1 mole of a sulfonating agent to at least 2 moles of said non-sulfonated aryl compound, whereby to sulfonate not more than one half of the latter.

4. A process as in claim 3, wherein 1 mole of chlorosulfonic acid is mixed with essentially two moles of said non-sulfonated aryl compound, whereby to produce an essentially equimolecular mixture of said non-sulfonated aryl compound and the corresponding aryl sulfonic acid.

5. A process of producing a diaryl sulfone, which comprises sulfonating an aromatic compound having not more than 12 C-atoms in its cyclic structure with a quantity of sulfonating agent adapted to sulfonate not more than one half said aromatic compound, adding phosphorus oxychloride in quntity theoretically sufficient to form a diaryl sulfone from all the aryl sulfonic acid present in the mixture by condensing the latter with an equivalent quantity of non-sulfonated aryl compound, refluxing the mass until evolution of HCl has essentially ceased, adding a Friedel-Crafts catalyst, heating the mass further at between 140° and 230° C. until no further reaction is observed, and recovering the formed diaryl sulfone from the reaction mass.

6. A process of producing diphenyl sulfone, which comprises reacting benzene with a quantity of chlorosulfonic acid sufficient to sulfonate not more than one half of said benzene, adding phosphorus oxychloride in quantity corresponding to from 0.35 to 0.50 mole of the latter for each mole of benzenesulfonic acid present in the reaction mass, and heating the mass at a temperature of 80° to 140° C. until reaction is no longer observed, then adding to the reaction mass a Friedel-Crafts catalyst, heating the reaction mass further at reflux temperature until reaction is no longer observed, and recovering therefrom diphenyl sulfone.

7. A process of producing diphenyl sulfone, which comprises reacting benzene with a quantity of chlorosulfonic acid sufficient to sulfonate more than one half of said benzene, adding phosphorus oxychloride in quantity corresponding to from 0.35 to 0.50 mole of the latter for each mole of benzenesulfonic acid present in the reaction mass, and heating the mass at a temperature of 80° to 140° C. until reaction is no longer observed, then adding to the reaction mass a Friedel-Crafts catalyst and addditional benzene, heating the reaction mass further at reflux temperature until reaction is no longer observed, and recovering therefrom diphenyl sulfone.

References Cited in the file of this patent

UNITED STATES PATENTS

| 2,224,964 | Huismann | Dec. 17, 1940 |
| 2,781,402 | Chadwick | Feb. 12, 1957 |

FOREIGN PATENTS

| 1,012,070 | Germany | July 11, 1957 |
| 1,084,257 | Germany | June 30, 1960 |

OTHER REFERENCES

Klosa: Arch Pharm 288, 48–49 (1955), cited in Chemical Abstracts 50, 15477c (1956).